United States Patent [19]

Yoshimoto et al.

[11] Patent Number: 4,833,549
[45] Date of Patent: May 23, 1989

[54] DIGITAL AUDIO TAPE RECORD/PLAY-BACK SYSTEM FOR RECORDING/PLAYING BACK CHARACTER DATA TOGETHER WITH DIGITAL AUDIO DATA

[75] Inventors: Itsuro Yoshimoto; Kuniyoshi Otsuki, both of Tokyo, Japan

[73] Assignee: Casio Computer Co., Ltd., Tokyo, Japan

[21] Appl. No.: 138,912

[22] Filed: Dec. 28, 1987

[30] Foreign Application Priority Data

Jan. 7, 1987 [JP] Japan .......................................... 62-505
Sep. 26, 1987 [JP] Japan ................................. 62-241089
Sep. 26, 1987 [JP] Japan ................................. 62-241091

[51] Int. Cl.⁴ .......................... H04H 5/78; G11B 5/00
[52] U.S. Cl. ...................................... 360/191; 360/18; 360/32
[58] Field of Search ................... 360/18, 19.1, 32, 33.1

[56] References Cited

U.S. PATENT DOCUMENTS

| | | |
|---|---|---|
| 4,523,237 | 6/1985 | Fukuda et al. . |
| 4,539,605 | 9/1985 | Hoshino et al. ........................ 360/32 |
| 4,615,024 | 9/1986 | Usui . |
| 4,758,902 | 7/1988 | Okamoto et al. .................. 360/32 X |
| 4,769,722 | 9/1988 | Itoh et al. ........................... 360/32 X |
| 4,772,959 | 9/1988 | Amano et al. ..................... 360/32 X |

*Primary Examiner*—Aristotelis M. Psitos
*Attorney, Agent, or Firm*—Frishauf, Holtz, Goodman & Woodward

[57] ABSTRACT

In this invention, pack data of a character mode including a character code is generated by a sub-code processor. The pack data is continuously recorded on a magnetic tape for a plurality of frames by rotary heads. When the pack data of the character mode is played back by the rotary heads, a controller detects the character code included in this pack data and supplies the detected code to a display to display corresponding characters.

17 Claims, 12 Drawing Sheets

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| \multicolumn{11}{c}{F} | | | | | PA | | | N | |
| \multicolumn{6}{c}{CN} | | CD | | | | | | | | |
| \multicolumn{8}{c}{D1} | | \multicolumn{8}{c}{D2} |
| \multicolumn{8}{c}{D3} | | \multicolumn{8}{c}{D4} |
| \multicolumn{8}{c}{D5} | | | | | | | | | |
F I G. 2
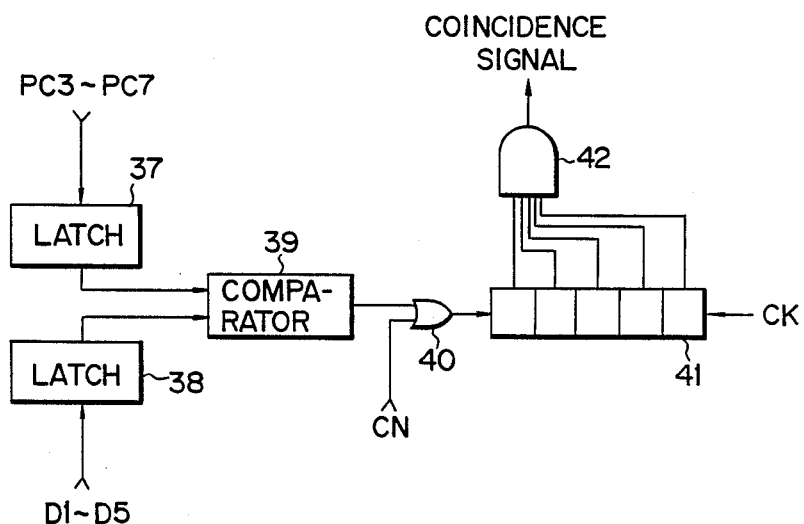
F I G. 3

| SUB-CODE ID | | | SUB-CODE ID | | BLOCK ADDRESS | | | |
|---|---|---|---|---|---|---|---|---|
| CONTROL ID | DATA ID | 1 | FORMAT ID | X | X | X | 0 |
| PNO ID(2) | PNO ID(3) | 1 | PNO ID(1) | X | X | X | 1 |
MSB · · · · · · LSB MSB · · · · · · LSB
F I G. 7
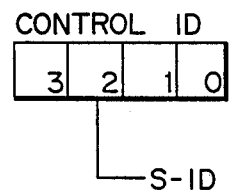
F I G. 8
F I G. 9

| ITEM | MODE |
|---|---|
| 0 0 0 0 | NO INFORMATION |
| 0 0 0 1 | PROGRAM TIME |
| 0 0 1 0 | ABSOLUTE TIME |
| ⋮ | |
| 1 0 0 0 | CHARACTER |
| ⋮ | |

FIG. 10

| | MSB | | | | | | LSB |
|---|---|---|---|---|---|---|---|
| PC1 | 1 | 0 | 0 | 0 | S | S O | R T |
| PC2 | W | F | M | T | A D R | | |
| PC3 | CHA ||||||| 
| PC4 | CHA |||||||
| PC5 | CHA |||||||
| PC6 | CHA |||||||
| PC7 | CHA |||||||
| PC8 | PARITY |||||||

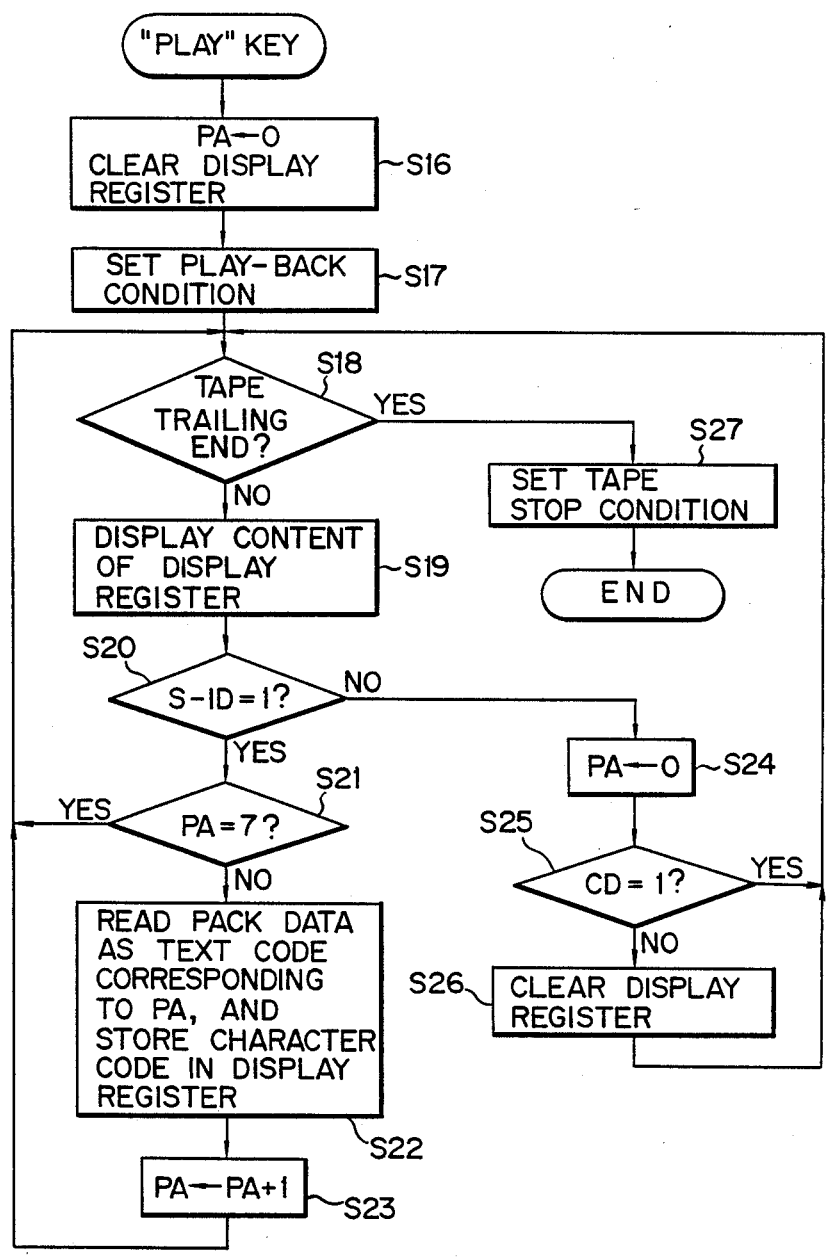
F I G. 14

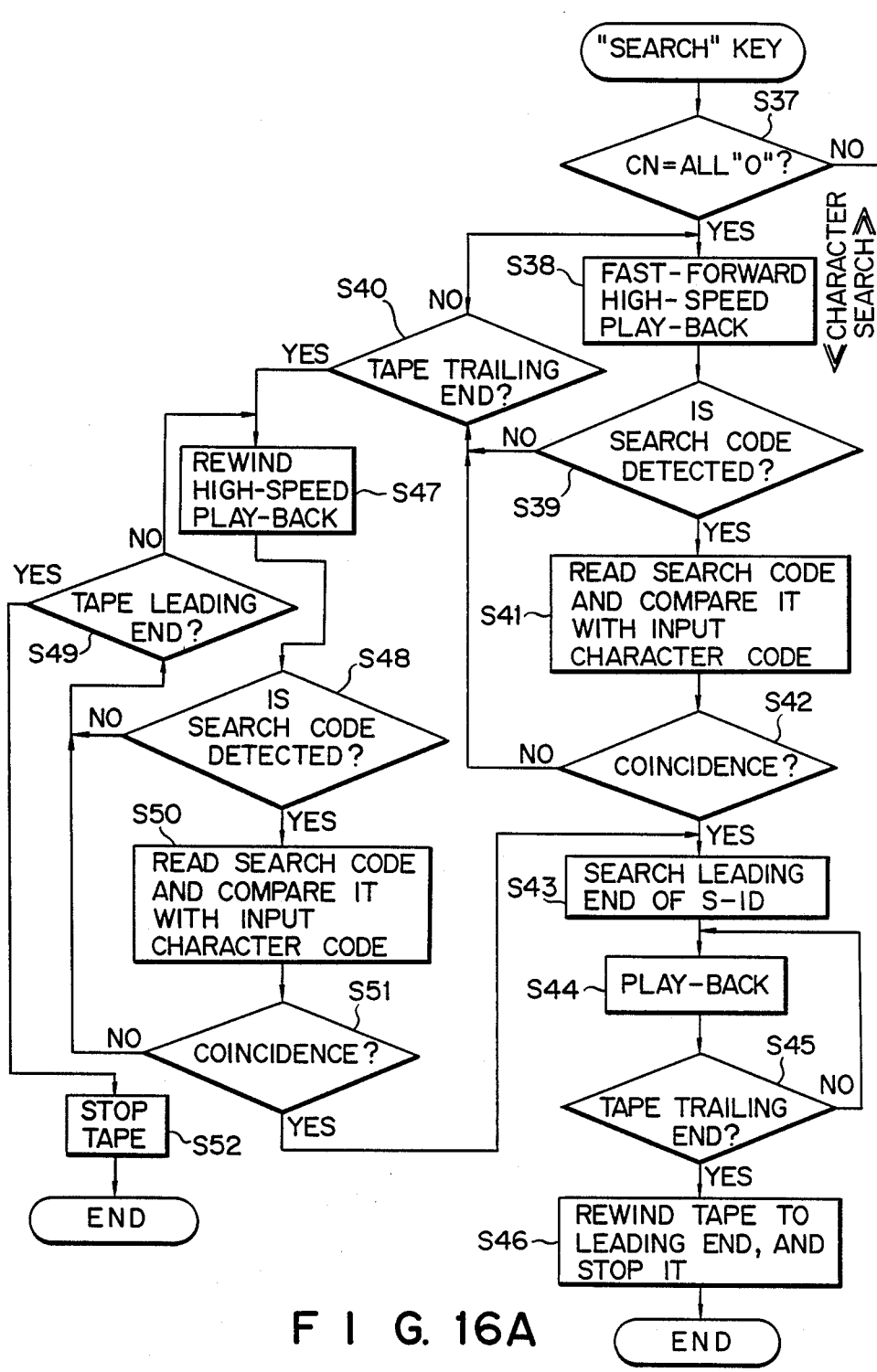
F I G. 16A

DIGITAL AUDIO TAPE RECORD/PLAY-BACK SYSTEM FOR RECORDING/PLAYING BACK CHARACTER DATA TOGETHER WITH DIGITAL AUDIO DATA

BACKGROUND OF THE INVENTION

The present invention relates to a digital audio tap record/play-back system for recording/playing back character data together with digital audio data.

The recent developments of audio equipment are remarkable. A typical example is a compact disk player for playing back data on a disk on which an audio signal is digitized and recorded.

In the field of tape recorders, studies on a digital tape recorder (DAT) system (disclosed in e.g., U.S. Pat. No. 4,523,237 to S. FUKUDA et al.) for recording/playing data on/from a magnetic tape have been made.

According to the DAT system, an analog audio signal is recorded in the form of a PCM signal on a DAT tape. The PCM signal is played back in the form of an analog audio signal. The DAT system can record and play back PCM signals with higher fidelity than a conventional analog recording system.

In order to best understand the present invention, general DAT standards will be described below.

A DAT (digital audio tape recorder) conference was established in 1981 to achieve DAT design standardization. DATs are classified into a stationary head type DAT (S-DAT) and a rotary head type DAT (R-DAT). The R-DAT is considerately used as commercial equipment since it can employ known ½-inch VTR techniques. Both the S- and R-DATs have a 48-kHz sampling frequency and 16-bit quantization. A DAT tape has a width of 3.81 mm, and a tape cassette for R-DAT is $73 \times 54 \times 10.5$ mm$^3$. An R-DAT head drum has a diameter of 30 mm, a speed of 2,000 rpm, and a tape winding angle of 90 degrees. One track (one record of one head, a 23.501-mm tape portion of 7.5-ms period) is divided into 196 blocks. PCM data including parity data constitutes 128 blocks. One block consists of 288 bits.

When a standard tape cassette is used, the R-DAT can perform 2-hour continuous record/play-back operation. Therefore, when a plurality of musical pieces (one musical piece has a length of about 3 minutes) are recorded using this R-DAT, a very large number of musical pieces (i.e., 40) can be recorded. It is very difficult to search a musical piece to be played back from the tape recording such a large number of musical pieces. For this reason, in the DAT standards, a program number can be recorded for each musical piece (program), and a desired program number can be input to easily search the corresponding musical piece. However, in the method using the program number, a user must know a correspondence between musical pieces recorded on the tape and program numbers. For this purpose, program numbers and titles of musical pieces are written on a label of a tape cassette. Thus, a user finds a program number corresponding to a desired musical piece in accordance with the content of this label and can input the program number. However, if a user loses this label, he can hardly know a correspondence between program numbers and titles.

A compact cassette recorder which is spread worldwide also has the above-mentioned drawbacks, and studies for eliminating the drawbacks have been made. For example, as shown in U.S. Pat. No. 4,615,024 to M. Usui, a title is recorded on a starting portion of a recording area for each musical piece, and the title is input to search the corresponding musical piece. As is known, in a compact cassette tape, signals are recorded parallel to the longitudinal direction of the tape. In the above method, a title recording area is followed by a musical piece recording area.

However, this technique cannot be applied to the R-DAT without modification. This is because in the R-DAT, signals are recorded not parallel to the longitudinal direction of the tape like in the compact cassette tape recorder but are recorded as discontinuous tracks which are inclined at about 6 degrees with respect to the longitudinal direction of the tape. More specifically, when recorded title data is read while traveling a tape at a speed 100 to 200 times a normal play-back speed, a rotary head is traced over a plurality of tracks. For this reason, the rotary head may fail to trace the title recording area. Therefore, a desired musical piece may not often be searched. musical piece may not often be searched.

Thus, a demand has arisen for development of a recording method of titles (not limited to a title of a musical piece but can be characters) complying with the R-DAT standards.

SUMMARY OF THE INVENTION

It is an object of the present invention to provide a digital audio tape record/play-back system which can record character data in a format suitable for an R-DAT format to be reliably played back.

In order to achieve the above object, there is provided an apparatus for recording character data together with digital audio data on a magnetic tape by using a rotary head, comprising a rotating drum provided with said rotary head for performing recording on said magnetic tape, said magnetic tape being wound around said rotating drum within a predetermined angular range, said rotary head recording oblique tracks, each of which has a PCM audio recording area and sub-code recording areas, analog analog to digital conversion means for receiving an analog audio signal and sampling the analog audio signal at a predetermined frequency to convert it into digital audio data, signal processing means, connected to said analog to digital conversion means, for adding an error correction code to the digital audio data to generate PCM audio data complying with an R-DAT (Rotary head type-Digital Audio Tape recorder) format, key input means having character keys for inputting characters, at least one key for instructing character recording on said magnetic tape, and keys for designating a travel state of said magnetic tape, mechanism drive means, connected to said key input means, for driving said magnetic tape and said rotating drum in response to operation of said key input means, sub-code processing means for generating sub-code block data having a sub-code ID and pack data corresponding to the R-DAT format, frame composing means connected to said signal processing means and said sub-code processing means, for composing the PCM audio data at a timing corresponding to said PCM audio recording area and the sub-code block data at a timing corresponding to said sub-code recording area to output the composed data as track format data corresponding to the R-DAT format, recording means, connected to said rotary head and said frame composing means, for modulating the track format data and outputting a recording signal to said rotary head, control means, connected to said key input means, said sub-code processing means, and said mechanism drive means, for controlling said mechanism drive means so that said magnetic tape and said rotary drum are set in a corresponding drive state upon operation of the travel condition setting keys of said key input means, character code data corresponding to characters which are input by the character keys is output to said sub-code processing means upon operation of the character recording instruction key of said key input means to cause said sub-code processing means to generate pack data of a character mode, and the generated pack data is continuously recorded in the sub-code recording area of said magnetic tape for a plurality of frames.

In order to achieve the above object, there is also provided an apparatus for playing back character data together with digital audio data on a magnetic tape using a rotary head, comprising a rotating drum provided with said rotary head for playing back a signal recorded on said magnetic tape, said magnetic tape being wound around said rotating drum within a predetermined angular range, said magnetic tape having tracks, each of which are including a PCM audio recording area for recording PCM audio data and sub-code record n areas for recording sub-code block data, the PCM audio data being data corresponding to an R-DAT format and including an error correction code and the digital audio data, the sub-code block data being data corresponding to the R-DAT format and including a sub-code ID and pack data, the pack data including pack data of a character mode, the pack data of the character mode being recorded in the sub-code recording area of said magnetic tape for a plurality of frames, key input means having a play-back key mechanism drive means, connected to said key input means, for driving said magnetic tape and said rotating drum in response to operation of said key input means, frame decomposing means, connected to said rotary head, for decomposing and outputting the PCM audio data at a timing corresponding to said PCM audio recording area and the sub-code block data at a timing corresponding to the sub-code recording area from a play-back signal played back by said rotary head, signal processing means, connected to said frame decomposing means, for receiving the PCM audio data from said frame decomposing means and performing error correction processing to output digital audio data, digital to analog conversion means, connected to said signal processing means, for converting the digital audio data output from said signal processing means to an analog audio signal, sub-code processing means, connected to said frame decomposing means, for receiving the sub-code block data from said frame decomposing means and storing the sub-code ID and the pack data included in the sub-code block data, and control means, connected to said key input means, said mechanism drive means, and said sub-code processing means, for controlling said mechanism drive means in response to operation of said play-back key of said key input means, so that said magnetic tape and said rotating drum are set in a corresponding drive state, storage of the pack data of the character mode in said sub-code processing means is detected and the character code data in the pack data of the character mode is supplied to a display device to cause said display device to display characters corresponding to the character code data.

According to the present invention, character-mode pack data including character code data is generated. The character code data is continuously recorded for a plurality of frames in a sub-code recording area of a magnetic tape, thus satisfactorily complying with the R-DAT format. Since the character-mode pack data is continuously recorded for a plurality of frames, it can be reliably played back by a rotary head in a high-speed play-back mode.

BRIEF DESCRIPTION OF THE DRAWINGS

FIG. 2 is a view showing part of a storage area of a control memory shown in FIG. 1;

FIG. 3 is a block diagram of a circuit for performing a search operation, which is provided as part of a controller shown in FIG. 1;

FIG. 7 is a view showing a format of a sub-code ID in the sub-code block;

FIG. 8 is a view showing a format of a control ID in the sub-code ID;

FIG. 9 is a view showing a format of pack data recorded in the sub-code data in FIG. 6;

FIG. 10 is an item table showing contents of pack data in accordance with items of the pack data shown in FIG. 9;

FIG. 11 is a pack format when an item is set for a character mode;

FIGS. 13(a) through 13() is a view showing a recorded state of a tape and pack data when character pack data is recorded as a text code and a search code;

FIG. 14 is a flow chart for explaining a character display operation upon operation of a [PLAY] key;

FIGS. 16A and 16B are flow charts for explaining the search operation.

PREFERRED EMBODIMENT OF THE INVENTION

An embodiment of a digital audio tape record/playback system according to the present invention will be described hereinafter with reference to the accompanying drawings. In this embodiment, a case will be exemplified wherein a rotary head type DAT is used.

Figure 1:
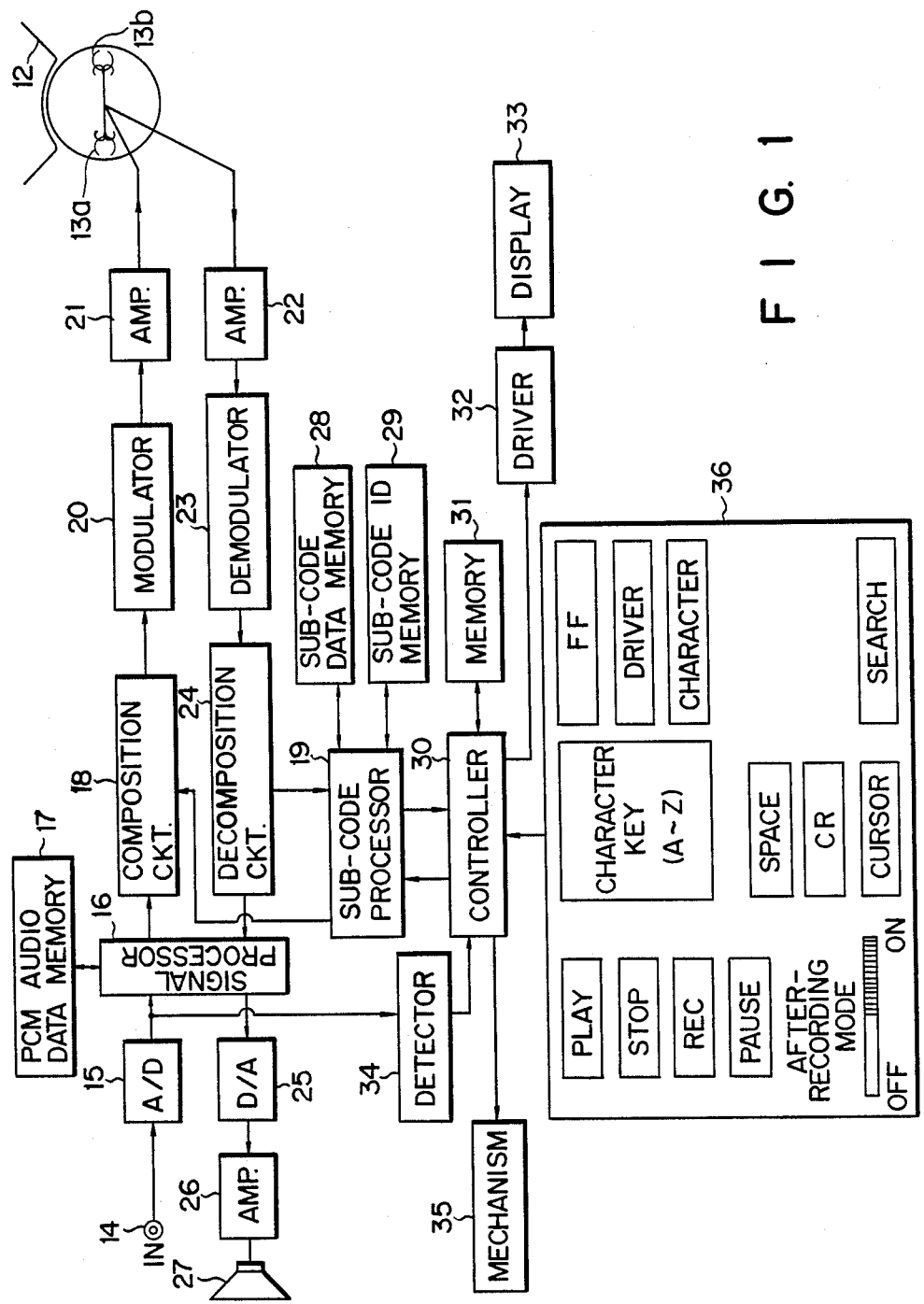
FIG. 1 is a block diagram showing an internal arrangement of an R-DAT according to an embodiment of the present invention.

FIG. 1 is a block diagram of the internal components of an R-DAT.

In FIG. 1, input terminal 14 receives an analog audio signal to be recorded. A/D converter 15 samples the audio signal applied from input terminal 14 at a sampling frequency of, e.g., 48 kHz, and converts the signal into a 16-bit digital audio signal. Signal processor 16 receives the digital audio signal and temporarily writes the digital audio signal in PCM audio data memory 17, while performing interleave processing of the signal. Processor 16 adds an error correction code to the data written in memory 17. Thereafter, processor 16 reads out and time-base compresses the data from memory 17, and outputs the readout data as PCM audio data corresponding to the R-DAT format. Frame composition circuit 18 synthesizes the PCM audio data output from processor 16 and sub-code block data output from sub-code processor 19 at timings of respective recording areas, and outputting the synthesized data as track format data corresponding to the R-DAT format. Modulator 20 performs modulation, suitable for magnetic recording, of the data output from frame composition circuit 18. Recording amplifier 21 amplifies the modulated signal output from modulator 20 and supplies the recording signal to rotary heads 13a and 13b for recording and playing back data on and from magnetic tape 12. Two rotary heads 13a and 13b are provided to rotating drum. In a recording/playing back operation, magnetic tape 12 is obliquely wound around rotating drum 11 at an angular range of 90 degrees.

Play-back amplifier 22 amplifies a play-back signal read by rotary heads 13a and 13b. Demodulator 23 demodulate the play-back signal amplified by amplifier 22 and outputs the demodulated data as track format data corresponding to the original R-DAT format. Frame decomposition circuit 24 decomposes the data output from demodulator 23 into PCM audio data, present at the timing of a PCM audio recording area, and sub-code block data, present at the timing of a sub-code recording area. The PCM audio data output from decomposition circuit 24 is sent to signal processor 16, and is temporarily written in memory 1.. After the data is subjected to error correction processing, the data is also subjected to de-interleave processing and time-base expansion processing, and is then supplied to D/A converter 25 as a digital audio signal. D/A converter 25 converts the digital audio signal into an analog audio signal. The analog audio signal is amplified by amplifier 26, and a corresponding sound is produced from loudspeaker 27.

In a recording mode, sub-code processor 19 generates sub-code block data (corresponding to the R-DAT format) to be recorded in the sub-code recording area based on the storage contents of sub-code data memory 28 and sub-code ID memory 29, and outputs the data to frame composition circuit 18. In a play-back mode, processor 19 causes memories 28 and 29 to temporarily store the sub-code block data output from circuit 24, and reads out necessary data from memories 28 and 29 and outputs the data to controller 30 under the control of controller 30. Controller 30 controls the entire system. Controller 30 performs data exchange with control memory 31, and sends display data to display 33 through driver 32 to cause display 33 to perform various display operations. Blank period detector receives the digital audio signal in the recording mode, detects a blank period thereof, and supplies a blank period detection signal to controller 30. Mechanism 35 is controlled by controller 30, and includes various mechanical systems such as a drum motor, a capstan motor, and the like. Key input unit 36 has various keys such as a [PLAY] key, a [STOP] key, a [REC] key, a [PAUSE] key, a [SPACE] key, character keys, a [CR] key, a [CURSOR] key, a [FF] key, a [REW] key, a [CHARACTER] key, a [SEARCH] key, an after recording mode designating switch, and the like.

FIG. 2 is a table showing some of registers and counters set in control memory 31. More specifically, memory 31 has 10-bit frame counter F, 3-bit pack address counter PA, and 3-bit number counter N, which are used in the after recording mode; 1-bit character display mode flag CD used in a display mode; 5-bit character number counter CN used in a search mode; 8-bit registers D1 to D5 for storing character codes input for the search operation; and various registers such as a display register, an arithmetic operation register, and the like.

FIG. 3 shows a search circuit provided in controller 30. In FIG. 3, 8-bit latch 37 receives data PC3 to PC7 (describe later). 8-bit latch 38 receives data D1 to D5. Comparator 39 detects a coincidence between the contents of latches 37 and 38. OR gate 40 receives the output of comparator 39 and signal CN from memory 31. Shift register 40 receives the output of OR gate 40. AND gate 42 receives and judges the content of shift register 41.

Figure 4:
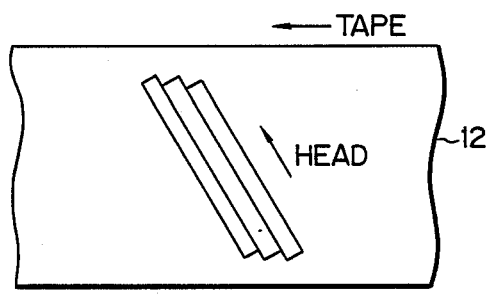
FIG. 4 is a view showing recording tracks on a magnetic tape in this embodiment.
Figure 5:
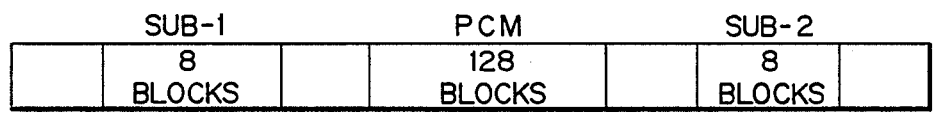
FIG. 5 is a view showing a format of one track in FIG. 4.
Figure 6:
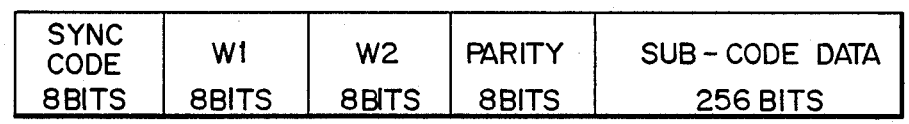
FIG. 6 is a view showing a format of one sub-code block recorded in a sub-code recording area in FIG. 5.

FIG. 4 shows a track state recorded on magnetic tape 12. As shown in FIG. 4, recording tracks having a predetermined inclination angle (about 6 degrees) are sequentially and alternately recorded on magnetic tape 12 by rotary heads 13a and 13b. As shown in FIG. 5, each recording track is constituted by a PCM audio recording area corresponding to 128 blocks at a central portion, and sub-code recording areas (SUB-1, SUB-2) corresponding to 8 blocks at both sides of the PCM audio recording area. The PCM audio recording area stores data obtained by pulse code modulating (PCM) an audio signal and adding an error correction code thereto. The sub-code recording area stores sub-code block data including 8 blocks each consisting of a sync code (8 bits), code W1 (8 bits) consisting of sub-code ID, code W2 (8 bits) consisting of sub-code ID and block address, parity for W1 and W2 (8 bits), and sub-code data (256 bits), as shown in FIG. 6.

Two blocks of the sub-code ID (W1, 8 bits), two blocks of block address and two blocks of sub-code ID (W2, 8 bits) constitute one unit, as shown in the format of FIG. 7. More specifically, upper 4 bits of the sub-code ID in an even-numbered block are used as a control ID and its lower 4 bits are used as a data ID. Upper 4 bits of the sub-code ID in an odd-numbered block are used as PNO·ID(2) and its lower 4 bits are used as PNO·ID(3). In the portions of the block address and the sub-code ID, the most significant bits are determined as "1", upper 3 bits in the even-numbered block are used as a format ID, lower 4 bits are used as the block address, upper 3 bits in the odd-numbered block are used as PNO·ID(1), and lower four bits in the even-and odd-numbered blocks are used as the block addresses. The third lowest bit in the 4-bit control ID serves to store a start ID, i.e., S-ID serving as a control signal for searching the starting portion of a program. The S-ID is recorded as "1" for about 300 frames (about 9 seconds) of the starting portion of each program. The PNO·ID(1) to PNO·ID(3) store absolute program numbers (001 to 799) of programs.

The sub-code data (256 bits) in the sub-code block data consists of four 64-bit pack data, as shown in FIG. 9. As shown in FIG. 9, of 8-bit (1-byte) PC1 to PC8, upper four bits of PC1 are assigned to an item for identifying a data content of the corresponding pack data, and PC8 is assigned to a parity for data in PC1 to PC7. As the item, modes shown in FIG. 10 are set. That is, if the item is "0000", the pack data indicates "no information"; and if "0001", a program time mode is set, and the data content of the pack data indicates a recording time of the corresponding program. If the item is "0010", a tape absolute time mode is set, and the data content of the pack data indicates a time from the beginning of a tape. In this embodiment, if the item is "1000", a character mode is set. The pack format in the character mode is as shown in FIG. 11. More specifically, upper 4 bits (8th to 5th bits) of PC1 are assigned to the item "1000", the next bit, i.e., the 4th bit is assigned to an "S" flag which is determined as "1" when the character data is used as a search code and is determined as "0" when it is used as a text code, and lower 3 bits are assigned to identification code "SORT" indicating a content of character data. If code "SORT" is "000", it corresponds to "General"; if "001", "Words"; if "010", "Artists"; and if "011", "Title". In PC2, the MSB is assigned to a "W" flag which stores "1" when a search code and a text code are recorded in an identical frame and "0" when either the search code or text code is recorded, and 5th to 7th bits are assigned to identification code "FMT" indicating types of code with which character data is recorded. If code "FMT" is "000", it corresponds to an ASCII code (ASCII; American Standard Code for Information Interchange); if "001", an ISO code (ISO; International Organization for Standardization); and if "010", a JIS code (JIS; Japan Industrial Standards). Lower 4 bits of PC2 are assigned to code "ADR" indicating an address of a pack. PC3 to PC7 are assigned to character codes for five characters (each character corresponds to 1 byte). PC8 is assigned to a parity for PC1 to PC7. Four pack data whose content Is defined by the item described above are assigned to the sub-code data in one block. 64 pack data can be recorded per track and 128 pack data can be recorded per frame (two tracks). Of the 128 pack data, 16 pack data correspond to an error correction code.

Operation of Embodiment

An operation of the above embodiment will be described below.

In a normal recording state, the after recording mode switch is turned off, and the "REC" key is operated. Then, an audio signal applied from input terminal 14 is pulse-code modulated and is recorded on the PCM audio recording area on magnetic tape 12 by A/D converter 15, processor 16, circuit 18, modulator 20, amplifier 21 and heads 13a, 13b. In this case, blank period detector 34 detects a blank period in the digital audio signal from A/D converter 15. When detector 34 detects the blank period lower than a full scale level by −42 dB for four seconds or more, it outputs a high level blank period detection signal to controller 30. Controller 30 determines that the trailing edge of this detection signal corresponds to the starting portion of a program, and sends a control signal to sub-code processor 19. Under the control of controller 30, processor 19 causes sub-code ID memory 29 to store "1" as the S-ID (start ID) for searching the starting portion of a program, and to store program number PNO while increasing it by "1" in response to the trailing edge of the blank period detection signal. Processor 19 generates pack data including time data for items "0001" and "0010", and causes sub-code data memory 28 to store the pack data. Processor 19 reads out data from memories 28 and 29, and generates sub-code block data corresponding to the R-DAT and supplies it to frame composition circuit 18. Thus, PCM audio data is recorded on the PCM audio recording area and sub-code block data is recorded on the sub-code recording area in the track format shown in FIG. 5.

When the "PLAY" key is operated while the after recording mode switch is OFF, the data recorded on magnetic tape 12 are played back by rotary heads 13a and 13b. The digital audio signal is converted to an original analog audio signal, and a corresponding sound is produced from loudspeaker 27. The sub-code block data recorded in the sub-code recording area is decomposed by frame decomposition circuit 24. Decomposed sub-code block data is sent to sub-code processor 19. Processor 19 causes sub-code data memory 28 to sequentially store the pack data in the sub-code block data. Processor 19 causes sub-code ID memory 29 to sequentially store the sub-code ID in the sub-code block data. Processor 19 reads out the pack data of the necessary item, and supplies the readout data to controller 30. Controller 30 receives program time data, for example, which is recorded as pack data of item "0001", and supplies it to display 33 through driver 32. Thus, display 33 displays a program time.

Character Code Recording Operation

A case will be described wherein a character code is recorded as a sub-code. The character code is recorded in the after recording mode which is set by turning on the after recording mode switch. In this embodiment, a character code consisting of a maximum of 33 characters is recorded. In this case, in an input character code corresponding to a predetermined number of characters, first five characters are automatically set as a search code for searching the starting portion of a program, and all input characters including the first five characters are set as a text code for display. These codes are recorded only in the sub-code recording area in the corresponding recording formats under the control of controller 30.

Assume that a plurality of musical pieces are recorded in the PCM audio recording area on magnetic tape 12 in the recording format described above. Pack data of item "0010+ (including tape absolute time data) is recorded in each sub-code recording area over a range from the leading to the trailing end of the tape. Pack data of item "0001" (including program time data) is recorded over a range from the leading end to the trailing end of each program. The start ID and program number (PNO) are recorded for 300 frames of the starting portion of each program.

In a normal play-back state, information in the sub-code recording area is managed by controller 30. Prior to character input, a user searches the starting position of a program for which characters such as a title are to be recorded or a tape position before the program. The user then turns on the after recording mode switch for inputting characters and spaces. 33 characters at most can be input using character keys for English letters "A" to "Z" and the [SPACE] key. If characters are erroneously input, a character to be corrected is designated by using the [CURSOR] key, and a new character is input thereon. IN put characters can correspond to a name of an artist, first 33 characters of words of a song as well as a title. After all the characters are input, the [CR] key is operated.

Figure 12:
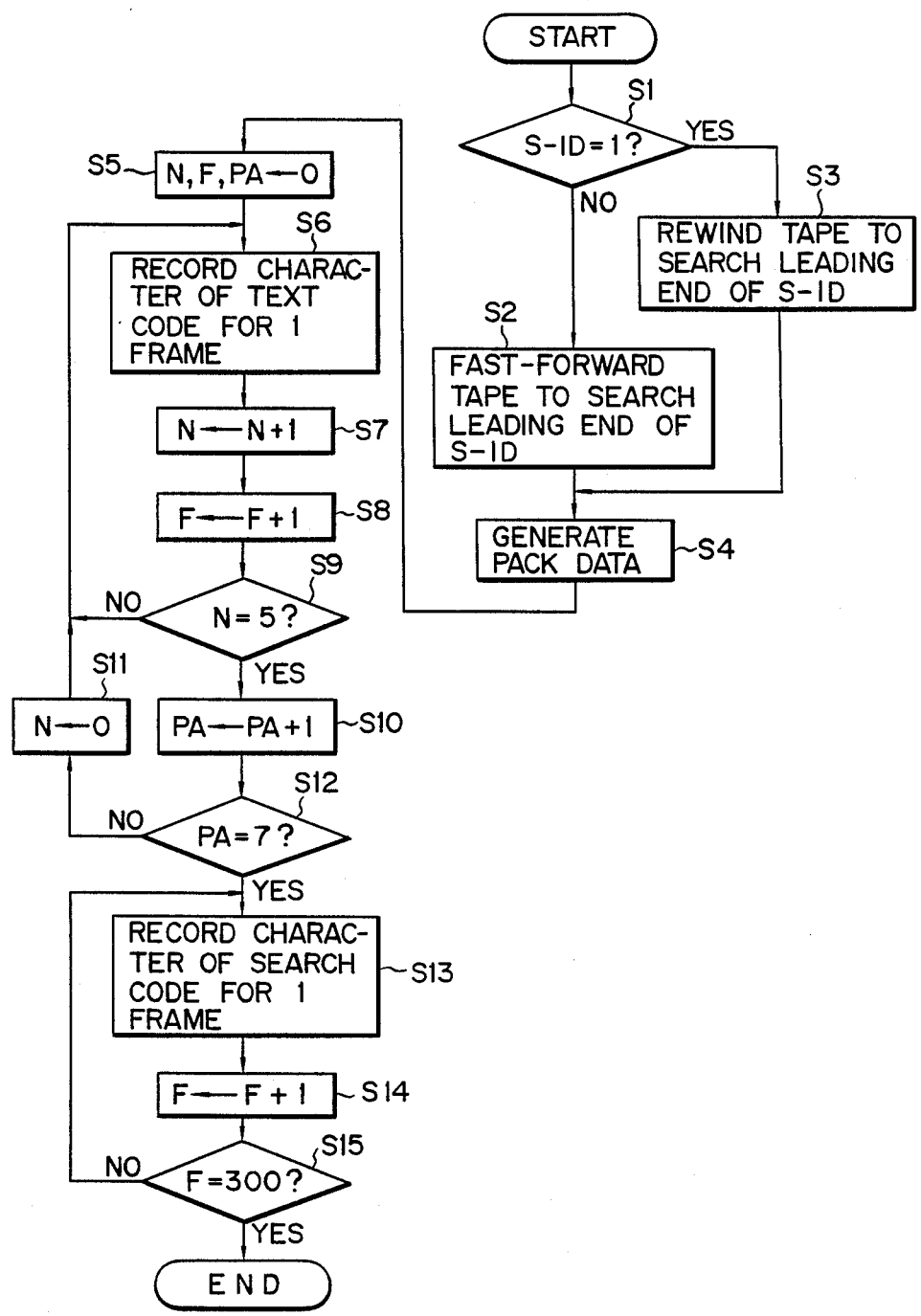
FIG. 12 is a flow chart schematically showing control processing of the controller in an after recording mode.

Controller 30 receives operation signals in response to character input, and sequentially stores key codes corresponding to the operated keys in a predetermined area of memory 31. When the "PLAY" key is operated, controller 30 executes the control flow shown in the flow chart in FIG. 12.

Controller 30 checks if the S-ID="1" is detected in order to discriminate whether the current position of magnetic tape 12 is located in the starting 300 frames (step S1). This operation is performed while the user plays back magnetic tape 12 in a normal play-back state prior to character input. In this operation, the S-ID which is detected by processor 19 and is stored in memory 31 is read out and checked by controller 30. If controller 30 determines that the S-ID="0" is detected, it is determined that the current tape position is before the leading end of a program for which characters are to be recorded. Controller 30 controls mechanism 35 to fast-forward and stop magnetic tape 12 at the recording leading end of the S-ID (step S2). If controller 30 determines that the S-ID "1" is detected, it is determined that the current tape position is located in the starting 300 frames of a program for which characters are to be recorded. Controller 30 controls mechanism 35 to rewind and stop magnetic tape 12 at the recording leading end of the S-ID (step S3).

Controller 30 reads out the key codes of the operated character keys stored in control memory 31. An controller 30 executes a control operation so as to cause processor 19 to generate pack data in a character mode shown in FIGS. 13(b) to 13(i) (step S4). For example, assume that the user inputs a character·string "YESTERDAY$_{10}$ ONCE$_{10}$ MORE" ( indicates a space) by operating character keys and the space key, and then operates the [CR] key. The key codes of the operated keys are stored in memory 32. Processor 19 generates pack data (FIG. 13(b)) consisting of a set of first five characters under the control of controller 30, and memory 28 stores the pack data.

More specifically, controller 30 outputs item="1000" indicating the character mode, "S" flag="0" indicating the text code, SORT="000" indicating a "General" code, "W" flag="0" indicating only the text code, "FMT"="000" indicating the ASCII code, and address "ADR"="000" in units of 8 bits (1byte). Controller 30 then reads out the key codes corresponding to first five characters of the input character string from memory 31, converts the key codes into ASCII codes (one character consists of 8 bits) and outputs the codes. Then, controller 30 outputs a 1-byte parity for the already output 7-byte data. Sub-code processor 19 causes memory 28 to store the data which are input byte by byte as one pack data. The input character string is divided into units of five characters, and is converted into the ASCII codes. The ASCII codes are sent from controller 30 to processor 19 together with the item, "S" flag, "SORT", "W" flag, "FMT" and address "ADR" which is updated for each pack, thereby generating seven text code pack data shown in FIGS. 13(b) to 13(h). These pack data are stored in memory 28. Note that the key code of the [CR] key is converted to two ASCII codes, i.e., a carriage return (CR) and a line feed (LF). When input characters are less than 33 characters like in this case, "NULL" codes (0) for remaining characters are sent from controller 30 to processor 19, and are stored as pack data shown in FIGS. 13(f) to 13(h).

When controller 30 completes the control operation for generating the seven pack data as the text codes, it executes a control operation for generating pack data as search codes. For the search code, the first five characters of the input character string are used. Controller 30 outputs to processor 19 item="1000" indicating the character mode, "S" flag="1" indicating a search code, "SORT"="000" indicating a "General" code, "W" flag="0" indicating only the search code, "FMT"="000" indicating the ASCII code, and address "ADR"="0000" in units of 8 bits (1 byte). Controller 30 reads out the first five characters of the input character string from memory 31, converts them into ASCII codes and outputs these codes. Controller 30 also outputs a 1-byte parity for the already output 7-byte data. Processor 19 causes memory 28 to store the data which are sequentially input in units of bytes, as search code pack data, as shown in FIG. 13(i).

Upon completion of the control operation for generating the pack data, controller 30 initializes number counter N, frame counter F, and pack address counter PA in memory 31 (step S5), and then executes a recording control operation of pack data.

Figure 13:
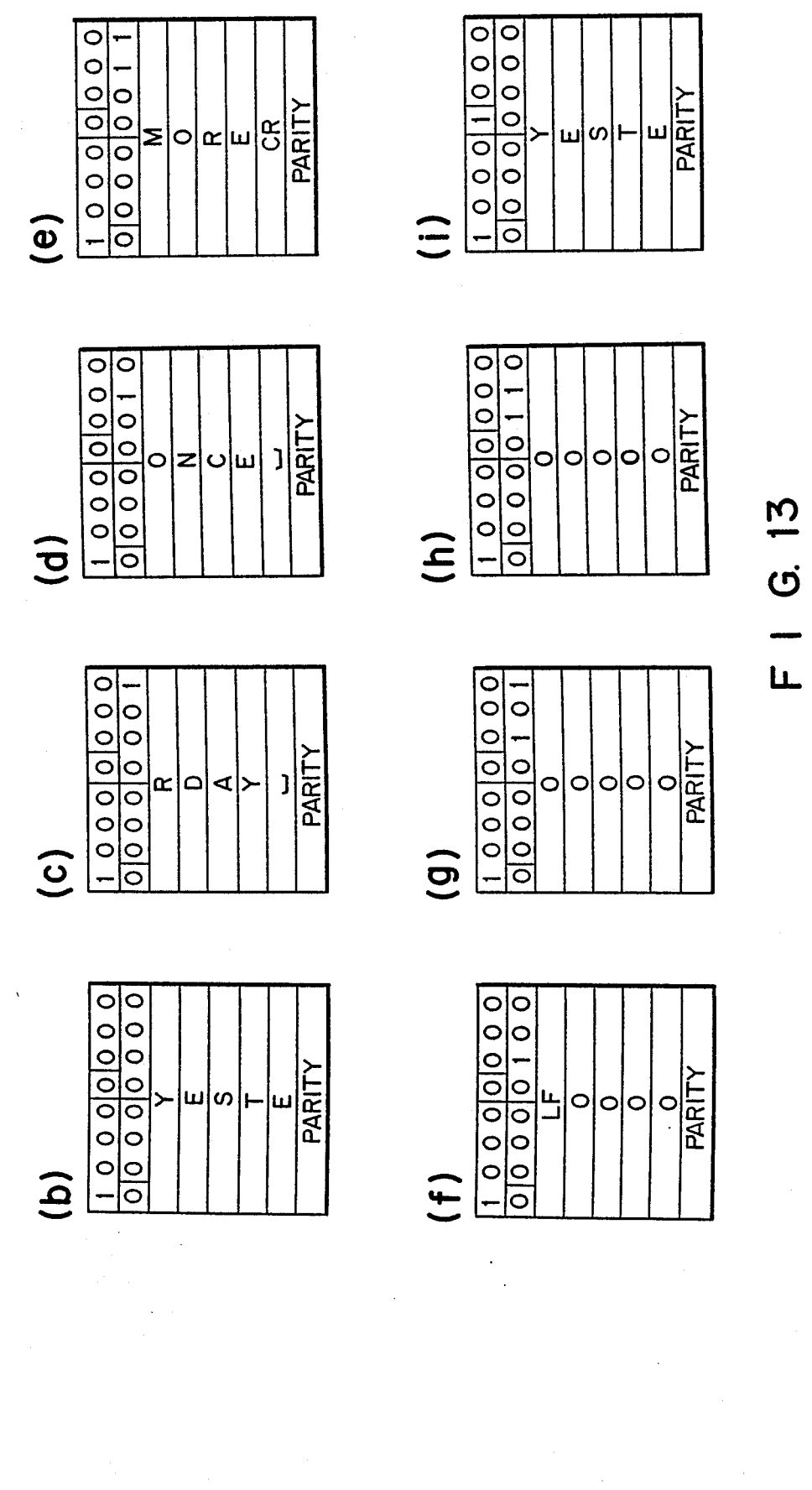
Figure 13A:
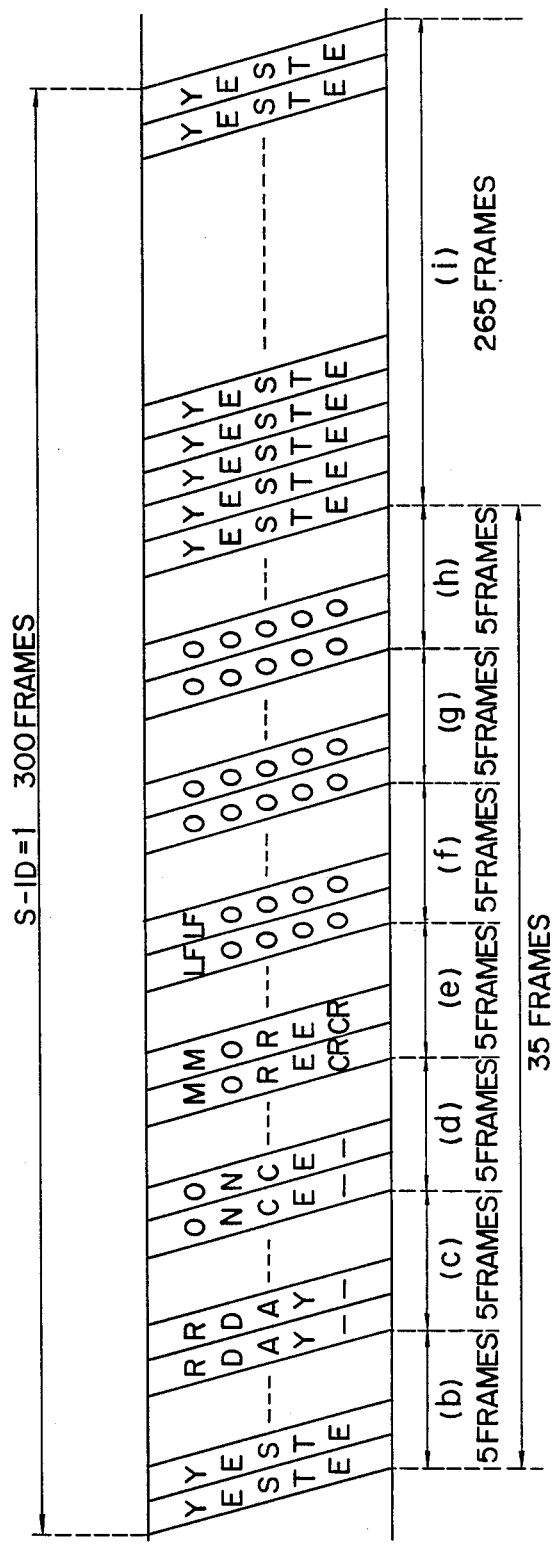

Memory 28 stores first to seventh pack data as text codes shown in FIGS. 13(b) to 13(h) and pack data as a search code shown in FIG. 13(i). Controller 30 controls mechanism 35 so that magnetic tape 12 in which the leading end of the S-ID has been searched travels at a rated speed and rotating drum 11 is rotated. In addition, controller 30 performs a control operation such that the sub-code recording area is set in a recording state and other areas are set in a play-back state. Under the control of controller 30, processor 19 reads out first pack data (FIG. 13(b)) as the text code corresponding to pack address counter PA=0. Processor 19 sends the sub-code block data including the first pack data to frame composition circuit 18 at a timing of the sub-code recording area. The sub-code data including the first pack data is recorded in each sub-code recording area on magnetic tape 12 for one frame (step S6 in FIG. 12). Controller 30 increments number counter N by "+1" (step S7), and also increments frame counter F by "+1" (step S8). Controller 30 continues the recording operation of the first pack data for one frame (steps S5 to S9) until number counter N has reached "5". When the first pack data is recorded for five frames, the control operation of controller 30 is advanced from step S9 to step S10. Controller 30 increments pack address counter PA by "+1", and sets number counter N=0 (step S11). Then, controller 30 executes processing (step S6) to cause processor 19 to read out second pack data (FIG. 13(c)) as the text code corresponding to PA=1 from memory 28 and to record the sub-code block data including the second pack data for one frame. When controller 30 repetitively executes the processing in steps S6 to S9, the second pack data is recorded for five frames. Thereafter, controller 30 repetitively executes processing in steps S9 to S11 until it is determined in step S12 that PA=7. When controller 30 executes the processing in steps S6 to S12 until PA=7, each of first to seventh pack data as the text codes is recorded for five frames of magnetic tape 12. As a result, the pack data are recorded for a total of 35 frames, as shown in FIG. 13(a).

If controller 30 determines in step S12 that PA=7, it then performs a recording control operation of the pack data as a search code. More specifically, controller 30 controls processor 19 to read out pack data (FIG. 13(i)) as a search code from memory 28. Processor 19 sends sub-code block data including the pack data as the search code to frame composition circuit 18 at a timing of the sub-code recording area. The pack data as the search code is recorded in the sub-code recording area on magnetic tape 12 for one frame (step S13). Controller 30 then increments frame counter F by "+1" (step S14), and continues the recording control of the pack data as the search code for one frame in step S13 until it is determined in step S15 that F=300. When controller 30 repetitively executes the processing in steps S13 to S15, the sub-code block data including the pack data as the search code shown in FIG. 13(i) is recorded for a total of 265 frames (from 36th frame to 300th frame).

When controller 30 executes the processing in steps S1 to S15, each of first to seventh pack data as the text codes is recorded in the sub-code recording area of the starting portion of a program on magnetic tape 12 in units of five frames in 1st to 35th frames, and pack data as an identical search code is repetitively recorded in 36th to 300th frames, as shown in FIG. 13(a). Note that during recording in the sub-code recording area, pack data of item "00001" indicating a program time is recorded while being updated from "0" from the leading end of a program together with the pack data of item "1000" shown in FIGS. 13(b) to 13(i). Pack data of item "0010" indicating a tape absolute time is recorded as time data continued from the trailing end of an immediately preceding program. Program number PNO is recorded in the sub-code ID while being updated, and the S-ID="1" is recorded for 300 frames from the leading end of a program.

When controller 30 completes the recording control operation of pack data in the character mode in the above-mentioned sub-code recording area for 300 frames of the starting portion of a program, it controls the respective circuits to set a normal play-back state. Thereafter, when the recording operation of characters for a program is performed, controller 30 executes the same operation as described above.

Character Display Operation

An operation will be described when characters are displayed using the magnetic tape on which the character are recorded as shown in FIG. 13(a).

Display of characters is performed in a normal constant speed play-back mode and in a high-speed play-back mode (e.g., 100 times a normal speed). Basically, of the character mode pack data of item "1000" stored in memory 28 by processor 19 in the play-back mode, controller 30 reads the character codes of PC3 to PC7 and causes a display register in memory 31 to sequentially store them as display data. Controller 30 sends the display data to display 33 through driver 32, thereby displaying characters. Display of characters can be switched by the [CHARACTER] key on key input unit 36 shown in FIG. 1 in a mode performing the character display and in a mode wherein no character display is performed.

A case will be described wherein the [PLAY] key on key input unit 36 is depressed in order to perform a play-back operation. When the [PLAY] key is operated after [CHARACTER] key while the after recording mode switch is kept off, controller 30 executes a control operation shown in the flow chart of FIG. 14. More specifically, memory 31 is provided with 1-bit flag CD indicating ON/OFF of the character display mode. Flag CD is set to be "0" in a tape stop state, and is set to be "1" when the [CHARACTER] key is operated before operation of the [PLAY], [FF], or [REW] key under the control of controller 30. Note that if CD=1, the character display mode is ON, and if CD=0, the character display mode is OFF. When controller 30 receives an operation signal of the [PLAY] key, it clears pack address counter PA and the display register in initialization (step S16 in FIG. 14). Controller 30 then controls mechanism 35 and the respective circuits to set a tape play-back state (step S17 in FIG. 14). The play-back state is maintained until the trailing end of the ape is detected in step S18. The leading or trailing end of the tape is detected such that transparent leader tape portions formed at the leading and trailing end portions of the magnetic tape are optically detected. That is, controller 30 discriminates the output from a detector (not shown). When the [STOP] key is operated during tape travel, the control program of controller 30 is interrupted at that time, and stop control of the tape travel is executed. In the tape play-back state, the sub-code block data recorded on the sub-code recording area is sent to processor 19 by frame decomposition circuit 24. Processor 19 causes memory 29 to store data in the sub-code ID and causes memory 28 to store pack data with a matching parity in units of items, e.g., pack data of item "0001" indicating a program time, pack data of item "0010" indicating a tape absolute time, pack data of item "1000" indicating the character mode, and the like. Controller 30 performs a control operation for reading out the storage content of the display character and supplying it to driver 32 to perform display on display 33 (step S19). In this case, the [PLAY] key has just been operated, and the display register is cleared by the processing in step S16. Therefore, no character is displayed. On the other hand, in the play-back state, controller 30 supplies an output command of the S-ID to processor 19 (step S20) so as to discriminate whether or not the play-back position of magnetic tape 12 has reached the starting position of a program. When the play-back position has reached the starting position of a program, the S-ID recorded for 300 frames of the starting portion of the program is reproduced, and processor 19 sends an S-ID detection signal to controller 30. When controller 30 receives the S-ID detection signal, it checks if the content of pack address counter PA has reached "7" in step S19 (step S21). In this case, the S-ID has just been detected. Therefore, PA=0, and the flow advances to step S22. Controller 30 supplies, to processor 19, a command for causing processor 19 to output pack data of address "ADR" corresponding to the content of pack address counter PA of the pack data as the text codes including item="1000" and "S" flag="0". Upon reception of this command, processor 19 outputs the corresponding pack data stored in memory 28 to controller 30. Controller 30 converts the character codes of PC3 to PC7 in this pack data into display data, and causes the display register of memory 31 to sequentially store them after the already stored data. In this case, since PA=0, the pack data (FIG. 13(b)) as the text code including address "ADR"="0000" is output to controller 30, and the character code in the pack data is stored in the display register.

Controller 30 increments the content of pack address counter PA (step S23). When S-ID="1" and controller 30 detects that the play-back position of magnetic tape 12 has reached the starting position of the program, it repetitively executes the processing in steps S18 to S23 while S-ID="1" is detected. More specifically, after controller 30 executes the processing in step S23, it executes display processing in step S19 via processing in step S18. In the processing in step S19, the character code in the pack data as the text code including address "ADR"="0000" stored in the display register is sent to display 33 to display characters.

Thereafter, when controller 30 repetitively executes processing in steps S18 to S23, the content of pack address counter PA is sequentially incremented from "1" to "6", and the character codes in the pack data as the text codes having the corresponding addresses "ADR" (addresses "0001" to "0010") corresponding to the values of PA are sequentially stored in the display register. Thus, display 33 displays characters. The number of pack data as text codes is seven as shown in FIGS. 13(b) to 13(h), and character codes included in the pack data correspond to a total of 33 characters. Therefore, the number of characters may exceed the number of display digits of display 33. In this case, 33 characters can be displayed while scrolling a display.

Note that each of first to seventh pack data as the text code including item="1000" and "S" flag="0" is multiplex-recorded for five frames, as shown in FIG. 13(a). Therefore, a sufficient redundancy to play back data in a rated speed play-back mode without causing an error is obtained.

If controller 30 detects in step S21 that the content of pack address counter PA has reached "7", it does not execute processing in steps S22 and S23, but repetitively executes processing in steps S18 to S21, thereby displaying character codes already stored in the display register. After 300 frames of the starting portion of a program on which S-ID="1" is recorded are played back, controller 30 detects that S-ID="0", and the flow advances from step S20 to S24. The processing in step S24 is to clear pack address counter PA. Controller 30 then checks in step S25 if character display mode flag CD is "1". This case corresponds to a play-back state after the [CHARACTER] key is depressed. Therefore, CD=1, and controller 30 repetitively executes processing in steps S18, S19, S20, S24, and S25. More specifically, controller 30 sequentially sends, to display 33 through driver 32, character code which have already been read from the display register of memory 31, thereby displaying characters. Character display is continued until an S-ID recorded on the starting portion of the next program is detected in step S20. During playback of the corresponding program, the characters such as a title are continuously displayed. When the trailing end of the tape is detected by the processing in step S18 during play-back, controller 30 controls mechanism 35 to stop tape travel (step S27).

When only the [PLAY] key is depressed without operating the [CHARACTER] key, CD=0 while the character display mode is OFF. Therefore, the flow advances from step S25 to S26, and the character codes stored in the display register of memory 31 are cleared. Then, processing in step S18 and subsequent steps is executed. Therefore, when the character display mode is OFF, character display is performed only while 300 frames of the starting portion of the program in which S-ID="1" is recorded are played back (about 9 seconds). This is to inform a user the fact that characters are recorded on the tape and a program of the title being played back although the character display mode is OFF.

Figure 15:
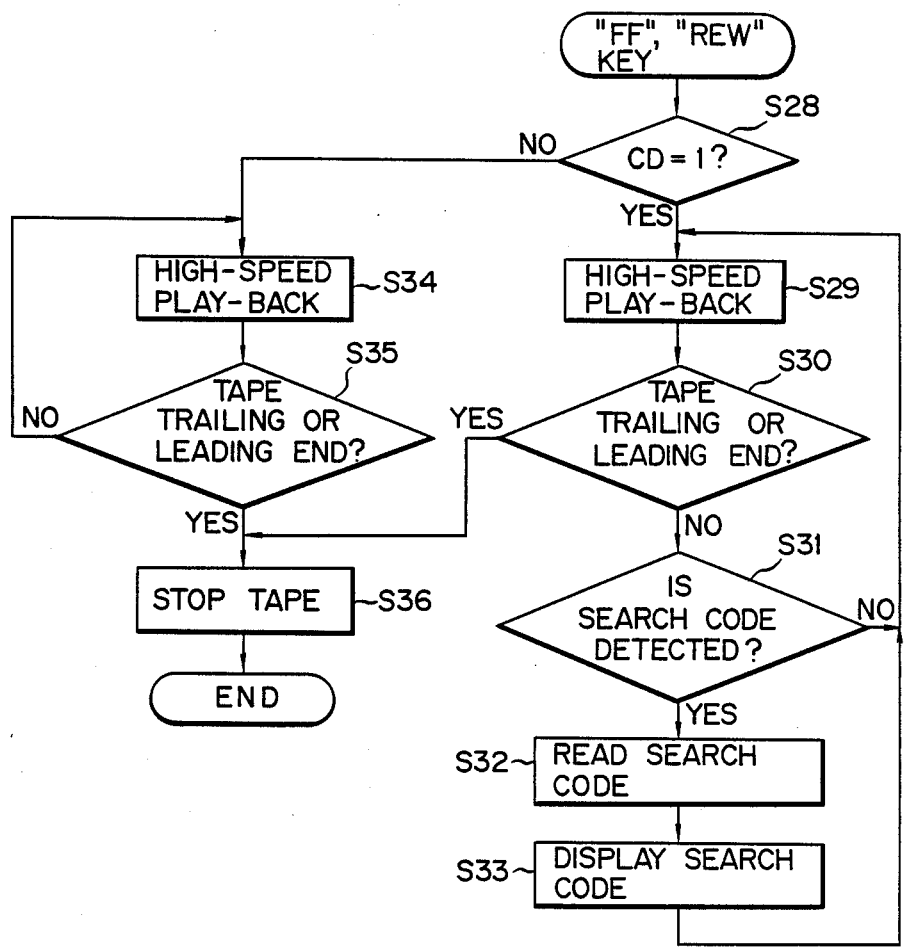
FIG. 15 is a flow chart for explaining a character display operation upon operation of [FF] and [REW] keys.

Character display can be performed when the tape travels at high speed. When the [FF] or [REW] key is operated after the [CHARACTER] key is operated, controller 30 executes a control operation shown in the flow chart of FIG. 15. In this case, flag CD in memory 31 is "1", and the character display mode is ON. When controller 30 detects CD=1, the flow advances from step S28 to step S29. In step S29, controller 30 controls mechanism 35 and the respective circuits to set a high-speed play-back state wherein the tape travels at a speed 100 times a normal speed. When the [FF] key is operated, the tape is fed in the forward direction, and when the [REW] key is operated, the tape is fed in the reverse direction. In the high-speed play-back state, sub-code block data stored in the sub-code recording area is sent from frame decomposition circuit 24 to sub-code processor 19. Processor 19 causes memory 29 to store data in the sub-code ID in the sub-code block data, and to cause memory 28 to store the pack data in the sub-code data with a matching parity in units of items, e.g., item="0001" indicating a program time, item="0010" indicating a tape absolute time, and item="1000" indicating a character code. The high-speed play-back operation is continued until the leading or trailing end of the tape is detected in step S26. Then, controller 30 supplies, to processor 19, a command for causing it to output pack data as a search code including item="1000" and "S" flag="1" (step S31). Upon reception of this command, if processor 19 detects corresponding pack data stored in memory 28, it outputs the data to controller 30. Controller 30 temporarily clears the display register of memory 31 converts character codes of PC3 to PC7 in this pack data into display data and stores them into the display register (step S32). Pack data including item="1000" and "S" flag="1" is character data as a search code. Since the pack data as the search code is multiplex-recorded for 256 frames, as shown in FIG. 13(a), a sufficient redundancy to play back data in a high-speed play-back mode without causing an error is obtained. More specifically, in the high-speed play-back mode, rotary heads 13a and 13b trace over a plurality of oblique recording tracks shown in FIG. 4. Multiplex recording of the search code over 256 frames is long enough to reliably play back data on some track even in the head trace operation in the high-speed play-back mode.

Controller 30 sends the character data already read in the processing in step S32 from the display register of memory 31 to display 33 through driver 32, thus displaying characters. Character display is continued until new character data is read as the search code for the next program which is recorded on the starting portion of a program, in steps S31 and S32. Upon repetition of this operation (steps S28 to S33), the recorded character codes are displayed in turn in the high-speed play-back mode. Thus, with the character display in the high-speed play-back mode, the user can immediately know the titles of programs recorded on this tape.

When the [FF] or [REW] key is operated without operating the [CHARACTER] key, CD=0 while the character display mode is OFF. Then, the flow advances from step S28 to S34, and controller 30 simply performs high-speed play-back operation. Controller 30 continues this operation until the leading or trailing end of the tape is detected in step S35. When the leading or trailing end of the tape is detected, controller 30 stops traveling of the tape in step S36. Note that when the leading or trailing end of the tape is detected in step S30, tape travel is also stopped.

The character display operation is performed in this manner. In this embodiment, the text code shown in FIG. 13(a) is recorded first and the search code is recorded thereafter for the following reason. That is, characters displayed in the rated speed play-back mode are based on the pack data recorded as the text code. If the text code is recorded on the starting portion of a program, the corresponding characters can be displayed immediately after the program begins to be played back. For this reason, a user can see character display immediately after the play-back operation of a program is started. Character display in the high-speed travel mode has a meaning of only checking for a user.

Therefore, no problem is posed even if the search code is recorded after the text code. The search code is used for a search operation (to be described later). In the search operation, after the search code is detected, the starting portion o the program is detected using the S-ID. Therefore, the search code need not be recorded on the starting portion of a program.

Search Operation Using Character Code

A search operation will be described below. In this case, a program on which desired characters are recorded is to be played back using a magnetic tape on which characters are recorded, as shown in FIG. 13(a)

In this embodiment, two search modes using characters are provided. One mode is a character search mode wherein first five characters of a maximum of 3 characters recorded on the starting portion of a program are input to search a program. The other mode is an initial search mode wherein first several characters of the first five characters, e.g., one character is input to search a program.

In these search modes, input characters and character codes recorded for 265 frames as search codes are compared.

When the search operation is to be performed, a user inputs first five characters of a title of a program to be selected using the character keys. In this case, assume that the character codes of a title are recorded on the starting potion of each program on the magnetic tape in the format shown in FIG. 13(a). Each time the character key is operated, controller 30 converts the operation signals of the operated character keys into the 8-bit ASCII codes, and causes registers D1 to D5 in memory 31 to sequentially store the codes. Controller 30 controls 5 bits of character number counter CN in accordance with the number of times of operation of the character keys. When five characters are input, CN is set to be "00000"; when four characters, "00001"; when three characters, "00011"; when two characters, "00111", and when one character, "01111".

Figure 16B:
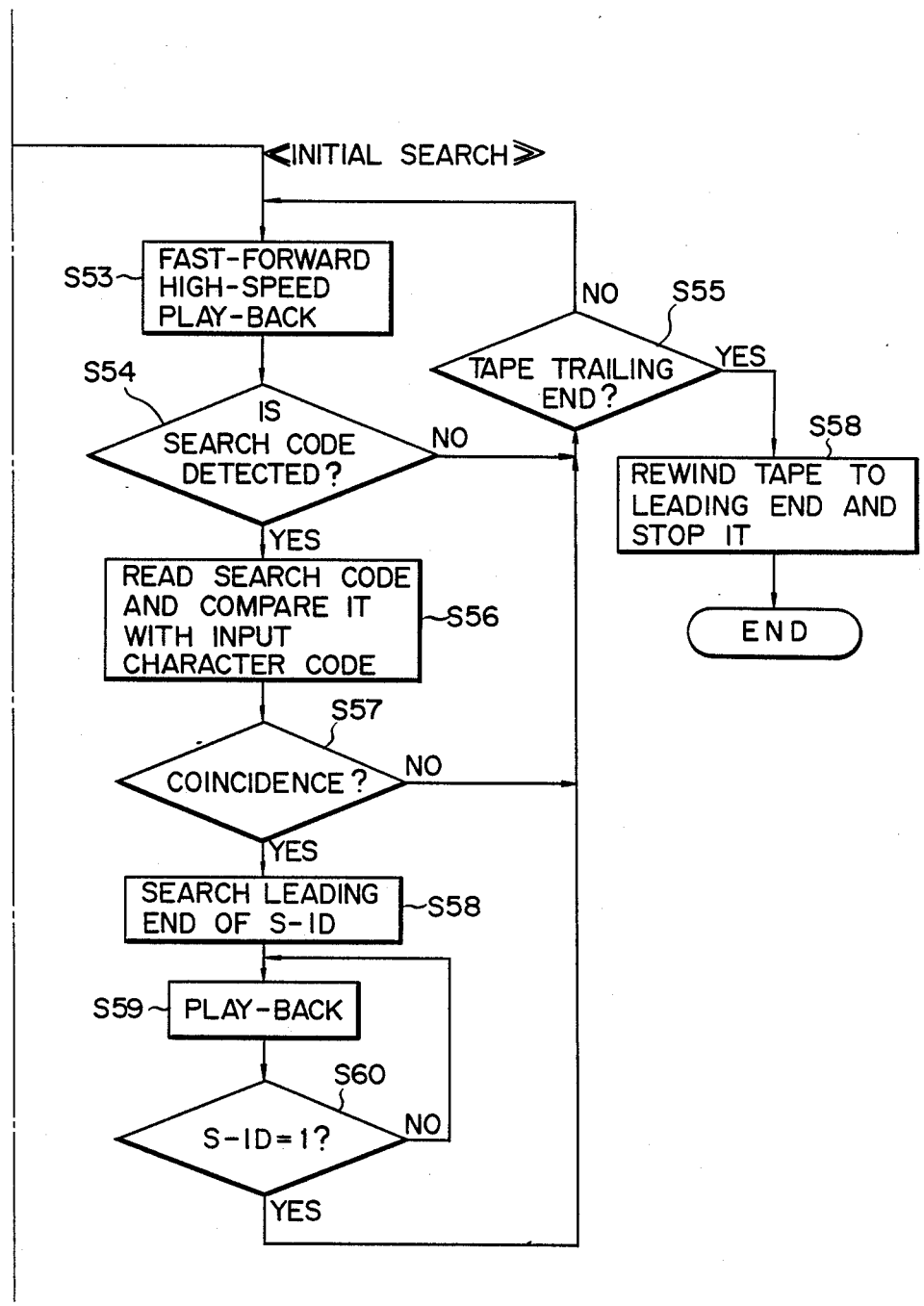

When the [SEARCH] key is operated after the characters are input, controller 30 executes a control operation shown in the flow charts of FIGS. 16A and 16B. Note that if the [SEARCH] key is operated after no characters are input, this operation is invalid, and no operation is performed. Upon operation of the [SEARCH] key, controller 30 checks if counter CN in memory 31 is all "0" s (step S37 in FIG. 16A). In this case, since five characters are input, counter CN is set to be "00000", and controller 30 performs next step S38.

When five characters are input, processing (steps S38 to S52) is performed. In step S38, controller 30 controls mechanism 35 and the respective circuits to set a fast-forward play-back state wherein the tape is fed forward at a high speed 100 times a normal speed. In this state, frame decomposition circuit 24 sends, to processor 19, the sub-code block data recorded in the sub-code recording area. Processor 19 causes memory 29 to store data in the sub-code ID in the sub-code block data, and to cause memory 28 to store the pack data in the sub-code data with a matching parity for each item, e.g., item="0001" indicating a program time, item="0010" indicating a tape absolute time, item="1000" indicating a character code, and the like. Controller 30 supplies, to processor 19, a command for causing it to detect and output pack data as a search code including item="1000" and "S" flag="1" (step S39). Upon reception of this command, if processor 19 detects pack data as the corresponding search code stored in memory 28, it outputs the detected data to controller 30. Controller 30 receives the character codes of PC3 to PC7 in the pack data, and causes latch 37 to sequentially latch these codes. Controller 30 reads out the input character codes for the search operation stored in registers D1 to D5 in memory 31 in synchronism with the latch timings of the character codes of PC3 to PC7, and causes latch 38 to sequentially latch these codes. In addition, the data in character number counter CN in memory 31 is also read out bit by bit from the MSB in synchronism with the latch timing, and is supplied to OR gate 40. The output from OR gate 40 is sequentially applied to shift register 41, and shift register 41 is sequentially shifted toward the MSB in response to shift clock CK supplied in synchronism with the latch timing. If a search code of a program to be searched is detected, the codes of PC3 to PC7 sequentially latched by latch 38 are the same as input character codes stored in registers D1 to D5. Comparator 39 detects a coincidence between these latch data, and outputs "1" signal for each latch timing. The output from comparator 39 is input to shift register 41 through OR gate 40 to sequentially shift the register. In this case, since the content of character number counter CN applied to OR gate 40 is all "0"s, it does not influence the output signal from comparator 39. Therefore, when PC3 to PC7 are equal to D1 to D5, "1" is stored in all the bits of shift register 41 when the codes of PC7 and D5 are latched. Since all the bit outputs from shift register 41 are applied to AND gate 42, the output from AND gate 42 becomes "1" at that time. The series of operations correspond to processing in step S41 shown in FIG. 16. When controller 30 detects output "1" from AND gate 42 (step S42), this means that a program on which the same character data as the input five characters are recorded as the search code can be searched. Thereafter, controller 30 executes processing for detecting the leading end of the program recorded with the corresponding search code and playing back the program from the beginning (step S44). This play-back operation is continued until the trailing end of the tape is detected in step S45. When the trailing end of the tape is detected, the tape is rewound and is stopped at the leading end and the character search operation is completed in step S46. When controller 30 detects no coincidence in the processing operation of step S41, the flow advances from step S42 to S40. Controller 40 repetitively executes the processing in steps S34 to S36 until the trailing end of the tape is detected in step S40, thus performing the search operation.

When controller 30 detects the trailing end of the tape in step S40, this means that a program to be searched cannot be detected from the tape position at the beginning of the search operation to the trailing end of the tape. In this case, in step S47, controller 30 performs control operation for performing the high-speed play-back operation at a speed 100 times a normal speed in a rewind state from the tape trailing end. During the rewind operation, controller 30 executes in step S48 the same processing as in step S39. Controller 30 performs in step S49 control operation for performing the high-speed play-back operation by rewinding until the search code is detected or until the tape leading end is detected. When a search code detection signal is sent from sub-code processor 19 to controller 30, controller 30 makes a comparison between character codes of PC3 to PC7 in the pack data and input character codes in registers D1 to D5 in step S50 in the sam manner as in step S41. Controller 30 repeats the processing in steps S47 to S51 until a coincidence is detected in step S51. When the coincidence is detected, controller 30 executes a series of control operations such that a play-back operation is performed from the leading end of the program to the trailing end of the program and then the tape is rewound and stopped at the the tape leading end in step S43 to S46. When a search code which coincides with the input characters cannot be detected during the high-speed play-back operation, controller 30 performs a control operation for stopping the tape when it is rewound to the tape leading end (step S52). In this manner, the character search operation is performed when five characters are input. Note that when no coincidence is detected if the search operation is performed up to the tape trailing end during the fast-forward high-speed play-back operation, the rewinding high-speed play-back operation is performed. In this case, when the search operation is performed for the tape which is half-rewound, the search operation of a desired program can be performed for the former half of the tape which has already been rewound. Therefore, the search operation can be performed for the entire tape.

The search operation (initial search mode) when input characters are smaller than five characters will be described. When a title Is recorded as characters, the above-mentioned character search mode is effective since a user can search a desired program as long as he knows a title, even if he cannot remember the absolute program number of the program. In contrast to this, in the initial search mode, when a kind of a program, e.g., "JAZZ" or a name of singer is to be recorded as characters, the programs of the same kind or the same signer can be sequentially played back. In order to perform the initial search operation, four characters or less to be searched are input using the character keys, and then the [SEARCH] key is operated. Each time the character key is operated, controller 30 converts the operation signals of the operated character keys into 8-bit ASCII codes, and causes registers D1 to D5 in memory 31 to sequentially store these codes. Controller 30 controls character number counter CN in accordance with the number of times of key operation. For example, if only the character key "A" is input, counter CN is set to be "01111", as described above.

When the [SEARCH] key is operated after the character keys are operated, controller 30 determines in step S37 in FIG. 16 that the content of counter CN does not correspond to all "0"s, and executes the processing in the initial search mode in steps S49 to S57. In step S53, controller 30 performs a control operation for setting a 100-times high-speed play-back operation while fast-forwarding the tape. In this state, the sub-code block data recorded in the sub-code recording area is sent from frame decomposition circuit 24 to processor 19. Processor 19 causes memory 39 to store the sub-code ID, and causes memory 28 to store pack data in the sub-code data with a matching parity for each item. Controller 30 supplies, to processor 19, a command for causing it to detect and output pack data as a search code including item = "1000" and "S" flag = "1" (step S54). Upon reception of this command, if processor 19 detects the pack data as the search code stored in memory 28, it outputs the detected data to controller 30. Controller 30 performs a control operation for performing the high-speed play-back operation until the search code is detected or until the tape trailing end is detected in step S55.

When the search code is detected, controller 30 receives the character codes of PC3 to PC7 in the pack data, and causes latch 37 shown in FIG. 3 to sequentially latch these codes. Controller 30 reads out the input character codes for the search operation stored in registers D1 to D5 in memory 31 in synchronism with the latch timings of the character codes of PC3 to PC7, and causes latch 38 to sequentially latch these codes. In synchronism with this latch timing, data is read out from character number counter CN in memory 31 bit by bit from the MSB, and is supplied to OR gate 40. The other input terminal of OR gate 40 receives the output from comparator 39 for comparing the latch data in latches 37 and 38. The output from OR gate 40 is sequentially applied to 5-bit shift register 41, and register 41 is shifted toward the MSB in response to shift clock CK which is supplied in synchronism with the latch timing. In this case, since only one character "A" is input, comparator 39 detects if the character code of PC3 of the read pack data coincides with the code of "A". Coincidence signals of other character codes of PC4 to PC7 from comparator 39 are influenced by "1" s stored in lower 4 bits of counter CN = "01111". As a result, "1" is stored in 4 bits of 5-bit shift register 41. Therefore, when only the character code of PC3 coincides with an input character "A", AND gate 42 generates a coincidence signal. A series of operations described above correspond to processing in step S56 in FIG. 16. Controller 30 repetitively executes processing in steps S53 to S57 until output "1" from AND gate 42 is detected. When output "1" is detected in step S57, a program on which a character code having the same initial as input character "A" is recorded as the search code can be searched. Thereafter, controller 30 executes a control operation for detecting a leading end portion of a program at which the S-ID of the program recorded with the detected search code is switched from "1" to "0" by a 4-times rewind play-back operation (step S58). Then, controller 30 performs a control operation for playing back the program from the beginning (step S59). This play-back operation is performed until the S-ID recorded on the starting portion of the next program is detected in step S60. That is, only the searched program is played back. When S-ID = "1" is detected in step S60, controller 30 again repeats the processing in steps S53 to S60, so as to sequentially play back programs on which character data having an initial character "A" is recorded. Note that when the tape trailing end is detected in step S55, controller 30 executes processing for rewinding and stopping the tape at its leading end (step S61).

In this manner, the search operation can be achieved using less than five characters. In this embodiment, programs whose first character coincides with an input character are sequentially played back. However, the system can be controlled so that a coincidence of a fifth character is discriminated.

What is claimed is:
1. An apparatus for recording character data together with digital audio data on a magnetic tape by using a rotary head, comprising:
   rotating drum provided with said rotary head for performing recording on said magnetic tape, said magnetic tape being wound around said rotating drum within a predetermined angular range, said rotary head recording oblique tracks, each of which has a PCM audio recording area and sub-code recording areas;

analog to digital conversion means for receiving an analog audio signal and sampling the analog audio signal at a predetermined frequency to convert it into digital audio data;

signal processing means, connected to said analog to digital conversion means, for adding an error correction code to the digital audio data to generate PCM audio data complying with an R-DAT (Rotary head type-Digital Audio Tape recorder) format;

key input means having character keys for inputting characters, at least one key for instructing character recording on said magnetic tape, and keys for designating a travel state of said magnetic tape;

mechanism drive means, connected to said key input means, for driving said magnetic tape and said rotating drum in response to operation of said key input means;

sub-code processing means for generating sub-code bock data having a sub-code ID and pack data corresponding to the R-DAT format;

frame composing means connected to said signal processing means and said sub-code processing means, for composing the PCM audio data at a timing corresponding to said PCM audio recording area and the sub-code block data at a timing corresponding to said sub-code recording area to output the composed data as track format data corresponding to the R-DAT format;

recording means, connected to said rotary head and said frame composing means, for modulating the track format data and outputting a recording signal to said rotary head;

control means, connected to said key input means, said sub-code processing means, and said mechanism drive means, for controlling said mechanism drive means so that said magnetic tape and said rotary drum are set in a corresponding drive state upon operation of the travel condition setting keys of said key input means, character code data corresponding to characters which are input by the character keys is output to said sub-code processing means upon operation of the character recording instruction key of said key input means to cause said sub-code processing means to generate pack data of a character mode, and the generated pack data is continuously recorded in the sub-code recording area of said magnetic tape for a plurality of frames.

2. The apparatus according to claim 1, wherein the pack data of the character mode generated by said sub-code processing means includes pack data serving as a search code and pack data serving as a text code, the pack data as the search code has only one type including identical character data and is continuously recorded in the sub-code recording area of said magnetic tape for a plurality of frames, the pack data as the text code has a plurality of types including different character data, and each of the plurality of pack data is recorded in the sub-code recording area of said magnetic tape for a plurality of frames.

3. The apparatus according to claim 2, wherein the number of character data included in the pack data as the search code is equal to that of the character data included in each of the plurality of pack data as the text code.

4. The apparatus according to claim 2, wherein the plurality of pack data as the text code include the character code data and address data, and the address data in the plurality of pack data have serial numbers.

5. The apparatus according to claim 2, wherein the pack data of the character mode includes data for distinguishing between the search code and the text code.

6. The apparatus according to claim 1, wherein the pack data of the character mode includes character code data and data indicating a code standard of the character code data.

7. The apparatus according to claim 1, wherein the pack data of the character mode includes data indicating the character mode.

8. The apparatus according to claim 1, wherein when the pack data of the character mode is to be recorded, said control means performs a control operation such that only the sub-code recording area of said magnetic tape is set in a recording state.

9. The apparatus according to claim 1, wherein said control means sets first predetermined number of input characters of a character string input by the character keys of said key input means for a search code, and the entire character string for a text code, and outputs character code data corresponding to the characters set for the search code and character code data corresponding to the character string set for the text code to said sub-code processing means;

said sub-code processing means generates one type of pack data of a character mode including the input character code data for the search code, and generates a plurality of types of pack data of a character mode including the input character code data for the text code under the control of said control means; and said control means performs a control operation such that the pack data as the search code is continuously recorded in the sub-code recording area of said magnetic tape for a plurality of frames, and each of the plurality of types of pack data as the text code is continuously recorded therein for a plurality of frames.

10. The apparatus according to claim 9, wherein PCM audio data for a plurality of programs are recorded on said magnetic tape, and a sub-code ID including a start ID is recorded in the sub-code recording area of a starting portion of each program for a plurality of frames; and said control means performs a control operation such that the pack data as the search code and the pack data as the text code are recorded in the sub-code recording area of said magnetic tape in which the start ID has been recorded.

11. The apparatus according to claim 10, wherein said control means performs a control operation such that the pack data as the text code is recorded in the sub-code recording area of said magnetic tape for a plurality of frames and the pack data as the search code is successively recorded for a plurality of frames on which sub-code ID including a start ID is recorded.

12. An apparatus for playing back character data together with digital audio data on a magnetic tape using a rotary head, comprising:

a rotating drum provided with said rotary head for playing back a signal recorded on said magnetic tape, said magnetic tape being wound around said rotating drum within a predetermined angular range, said magnetic tape having tracks, each of which are including a PCM audio recording area for recording PCM audio data and sub-code recording areas for recording sub-code block data, the PCM audio data being data corresponding to an R-DAT format and including an error correction code and the digital audio data, the sub-code block data being data corresponding to the R-DAT format and including a sub-code ID and pack data, the pack data including pack data of a character mode, the pack data of the character mode being recorded in the sub-code recording area of said magnetic tape for a plurality of frames;

key input means having a play-back key;

mechanism drive means, connected to said key input means, for driving said magnetic tape and said rotating drum in response to operation of said key input means;

frame decomposing means, connected to said rotary head, for decomposing and outputting the PCM audio data at a timing corresponding to said PCM audio recording area and the sub-code block data at a timing corresponding to the sub-code recording area from a play-back signal played back by said rotary head;

signal processing means, connected to said frame decomposing means, for receiving the PCM audio data from said frame decomposing means and performing error correction processing to output digital audio data;

digital to analog conversion means, connected to said signal processing means, for converting the digital audio data output from said signal processing means to an analog audio signal;

sub-code processing means, connected to said frame decomposing means, for receiving the sub-code block data from said frame decomposing means and storing the sub-code ID and the pack data included in the sub-code block data; and control means, connected to said key input means, said mechanism drive means, and said sub-code processing means, for controlling said mechanism drive means in response to operation of said play-back key of said key input means, so that said magnetic tape and said rotating drum are set in a corresponding drive state, storage of the pack data of the character mode in said sub-code processing means is detected and the character code data in the pack data of the character mode is supplied to a display device to cause said display device to display characters corresponding to the character code data.

13. The apparatus according to claim 12, wherein the pack data of the character mode includes pack data serving as a search code and pack data serving as a text code, the pack data as the search code has only one type including identical character data and is continuously recorded in the sub-code recording area of said magnetic tape for a plurality of frames, the pack data as the text code has a plurality of types including different character data, and each of the plurality of pack data is recorded in the sub-code recording area of said magnetic tape for a plurality of frames;

said key input means further has a high-speed travel key; and said control means performs a control operation such that said rotary head and said rotating drum are set in a rated-speed play-back state in response to operation of said play-back key of said key input means and in a high-speed play-back state upon operation of said high-speed travel key, and receives the pack data as the text code in the rated-speed play-back mode and the pack data as the search code in the high-speed playback mode to supply the character code data included in these pack data to said display device so as to cause said display device to display the characters corresponding to the character code data.

14. The apparatus according to claim 13, wherein the plurality of pack data as the text code include the character code data and address data, and the address data in the plurality of pack data have serial numbers, and said control means sorts the character code data included in the pack data as the text code in the order indicated by the address data, and sends the data to said display device to cause said display device to display the characters corresponding to the character code data.

15. The apparatus according to claim 12, wherein PCM audio data for a plurality of programs are recorded on said magnetic tape, and the pack data of the character mode, having identical contents are continuously recorded in the sub-code recording areas of each program for a plurality of frames, said key input means has a search key for selecting a desired program; and said control means controls said mechanism drive means to be in the high-speed play-back state in response to operation of said search key of said key input means, and compares the character code data included in the pack data of the character mode with characters input by the character keys of said key input means so as to play back a program, in which the pack data of the character mode including the character code data which coincides with the input characters is recorded in the sub-code recording area.

16. The apparatus according to claim 15, wherein the pack data of the character mode includes character code data corresponding to a plurality of characters; and when the number of characters input by said character keys of said key input means is smaller than the number of characters indicated by the character code data included in the pack data of the character mode, said control means compares the input characters with the character code data corresponding in number thereto, so as to play back a program, in which the pack mode of the character mode for which a coincidence is detected is recorded in the sub-code recording area.

17. The apparatus according to claim 16, wherein said control means sets a high-speed play-back mode after a play-back operation of a selected program is completed, thus continuing the program selection operation.

* * * * *